Figure 1:
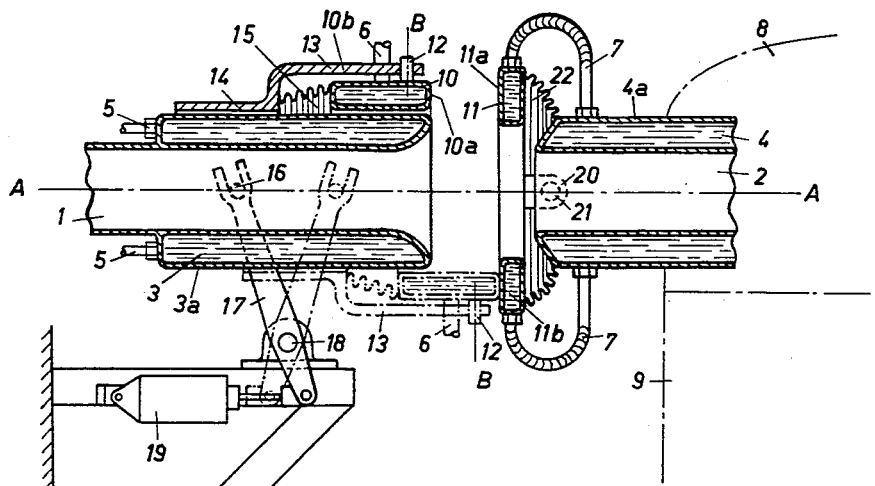

INVENTOR.
André Anding
BY Werner W. Kleeman
ATTORNEY

United States Patent Office 3,154,326
Patented Oct. 27, 1964

1

3,154,326
COUPLING MEANS, PARTICULARLY RELEASABLE PACKING FOR PIPING OR THE LIKE
André Anding, Gerlafingen, Switzerland, assignor to Gesellschaft der Ludw. von Roll'schen Eisenwerke AG., Gerlafingen, Switzerland, a corporation of Switzerland
Filed Nov. 13, 1961, Ser. No. 151,933
Claims priority, application Switzerland, Nov. 16, 1960, 12,828/60
8 Claims. (Cl. 285—9)

The present invention generally relates to an arrangement for detachably coupling together oppositely arranged pipe ends or the like and, more particularly, to a releasable packing for the connecting of a stationary pipe end to a pipe end which is movable transversely to the pipe axis.

A packing of this kind is especially required, for instance, in the case of electric furnaces provided with vapor discharge conduits or piping. For example, in such an installation the movable pipe end is constituted by a suction stub pipe member which is rigidly connected to the roof of the furnace, and the stationary pipe end is constituted by a fixedly installed suction pipeline. In order to permit a tilting or lifting-off of the furnace roof in order to change the charge, as well as a tilting of the furnace together with the roof, there must be provided between the two connectable pipe ends a releasable coupling connection, which in the released position permits an unhampered movement of the suction stub pipe mounted on the furnace roof in any desired direction transverse to the pipe axis.

The releasable packing arrangement according to the teachings of the present invention is characterised by a first packing element which is pivotably mounted on one pipe end, a second packing element which is mounted on the other pipe end so as to be both pivotable and axially displaceable in the direction of the pipe axis, and by flexible or expansible packing means between each pipe end and its associated packing element. The packing elements are provided with mutually facing sealing surfaces and the axes of pivoting of the two packing elements are arranged at least approximately at right angles relative to one another and to the pipe axis. In this manner it can be ensured that even if there is a misalignment of the respective pipe members, it is nevertheless possible to detachably connect such together so that the coupled together pipe members define a flow passageway which permits movement of a fluid medium therethrough.

Accordingly, it is an important object of the present invention to provide means for effectively coupling together a pair of conduits or the like in a fluid-tight connection even if said conduits are misaligned.

Another important object of the present invention is to provide a releasable packing arrangement which can reliably connect together oppositely facing pipe ends while compensating for any misalignment thereof.

Still another important object of the present invention is to provide means for detachably coupling together conduit members at their opposed ends in a relatively simple and efficient manner.

Yet another important object of the present invention is to provide a novelly constructed releasable packing arrangement which is of relatively simplifier construction, economical to manufacture, and is adapted to positively releasably connect a plurality of conduit members together in a positive and reliable manner while compensating for any misalignment of said conduit members.

These and still further objects and the entire scope of applicability of the present invention will become apparent from the deailed description given hereinafter; it should be understood, however, that the detailed description and specific example, while indicating a preferred embodiment of the invention, is given by way of illustration only, since various changes and modifications within the spirit and scope of the invention will become apparent to those skilled in the art from this detailed description.

Figure 2:
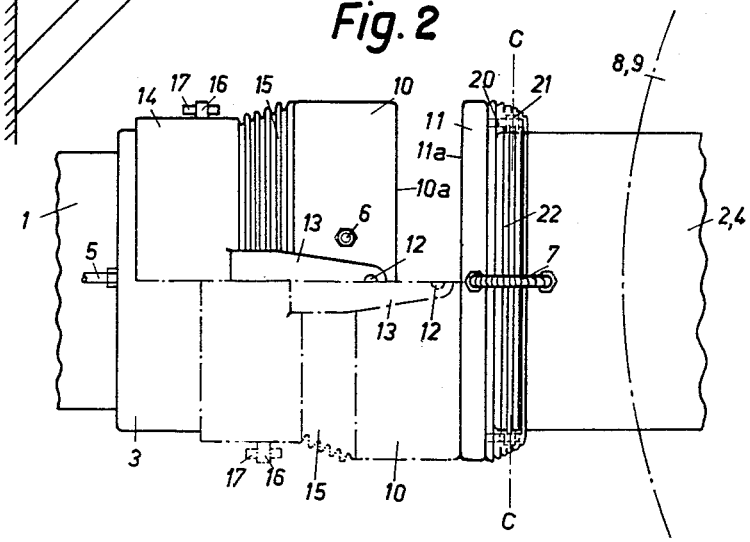

In the drawing:

FIG. 1 is a side sectional view of a releasable packing arrangement for connecting together a pair of opposed conduit or pipe members and designed according to the teachings of the present invention; and FIG. 2 is a top plan view of the packing arrangement shown in FIG. 1.

Referring now to the drawing wherein the uncoupled position of the packing is shown in full lines in the upper-half of each respective figure, and the closed or coupled position of the packing is shown in phantom lines in the lower-half of each respective figure, there is clearly shown an arrangement for releasably connecting together a pair of oppositely arranged pipe members 1 and 2. For convenience in description and, by way of example, the packing arrangement will be described in conjunction with a furnace installation although other environments of use are contemplated and will readily suggest themselves to those skilled in the art.

Thus, the illustrated and to be described embodiment is concerned with a releasable packing or coupling arrangement associated in the suction pipeline for the flue gases of an electric furnace to provide a releasable connection between two pipe ends 1 and 2 situated opposite one another. The pipe end 1 is fixedly mounted and communicates, for example, with a dust separating plant or with a suction fan or otherwise for removal of flue gases. The other pipe end 2 is rigidly connected to the roof 8 of the furnace 9, indicated in phantom lines, and is adapted to be displaceable together with said roof transversely with respect to the pipe axis A—A when the packing device is released. For example, in order to change charges and when it is desired to tip the furnace 9 with the roof 8 mounted thereupon.

The shifting of the roof 8 or furnace 9 back into its normal position in which a fluid or sealing-tight connection between the respective ends of the pipe members 1 and 2 is to be re-established, is in actual practice generally not carried out with great accuracy. Therefore, the movable pipe end 2 does not always come into exactly the same position opposite the fixed pipe end 1. On the contrary, deviations in the axial direction of the pipe end 2 and in the spacing of the pipe ends from one another generally occur, together with displacements in the lateral and vertical directions. Such non-alignment of the pipe members 1 and 2 must, however, not prejudice the quality of the sealing-tight connection.

Accordingly, and for this purpose, a first packing element 11 is pivotably mounted by means of straps 20 or the like and fastening members such as bolts 21 on the movable pipe end 2 in such a manner as to be pivotable about the horizontal axis C—C (see FIG. 2). Mounted on the stationary pipe end 1 is a displaceable supporting sleeve member 14 which, by means of its flanges or arms 13 and fastening members such as bolts 12, carries a second packing element 10. The latter is constructed as a tubular member or sleeve which surrounds the pipe end 1 with a certain clearance and is pivotable about a vertical axis B—B defined by the bolt means 12 and, therefore, at right angles to the axis C—C and to the pipe axis A—A. For axially shifting the support sleeve member 14 together with the tubular and coaxially arranged packing element 10 along the pipe axis A—A, in order to release and re-establish the sealing-tight connection between the respective ends of the pipe members 1 and 2, any suitable adjusting or driving device is provided. In the present case a pneumatically or hydraulically operated driving or operating cylinder 19 is provided which is connected to the sleeve member 14 by means of the pins 16 and the bifurcated two-armed levers 17 mounted on the fulcrum pin 18.

The space between the pivotable packing element 11 and the pipe end 2 is sealed-off by a flexible bellows 22. The seal between the packing element 10 and the pipe end 1 is effected by the flexible bellows 15 and the seating of the sleeve member 14 on the pipe end. In the closed or coupled position of the device as shown in phantom in FIGS. 1 and 2, a fluid or sealing-tight connection is established between the two pipe ends 1 and 2 by means of the mutually facing sealing surfaces 10a and 11a of the packing elements 10 and 11, respectively, which surfaces bear against one another. However, when the packing members 10 and 11 are uncoupled or released, the movable pipe member 2 is freely displaceable relative to the stationary pipe 1 in any desired direction transverse to the pipe axis. Since the axes of pivoting B—B and C—C of the two packing elements 10 and 11 are situated at least approximately at right angles to one another and to the pipe axis A—A, when the packing element 10 is displaced in its closing direction an effect is produced which is similar to a universal-joint connection i.e., if there are deviations in the axial direction of the two pipe ends, the positions of the two packing elements 10 and 11 are adjusted to one another so that the two sealing surfaces always bear flush against one another within the range of pivoting of said elements. But axial offsetting of the two pipe ends within the annular width of the annular packing element 11 and the varying spacings between the two pipe ends within the range of the longitudinal displaceability of the sleeve 14, also do not prejudice the quality of the sealing-tight connection in any way. A further advantage consists in the fact that very easy and rapid operation, and particularly, remote operation of the packing device is possible.

In the present case, the pipeline is intended for conducting hot flue gases. Therefore, the pipe ends 1 and 2 are conveniently double-walled to form the respective compartments 3 and 4, and the packing elements 10 and 11 are constructed as hollow elements provided with the chambers or compartments 10b and 11b. A cooling medium, for example water, is circulated through the aforedescribed chambers or compartments 3, 4, 10b and 11b. The element 3a forming the compartment 3 and surrounding the pipe end 1 is connected by means of stub pipes or tubing 5, and the interior of the packing element 10 by means of stub pipes 6, to a suitable circulation system known to the art. The compartment 11b of the packing element 11 communicates through flexible pipes 7 with the compartment 4 defined by the element 4a which surrounds the pipe end 2, and which in turn is also connected to a suitable circulation system (not shown).

Many modifications of the illustrated and described embodiment are, of course, possible and contemplated within the framework and teachings of the present invention. The construction of the packing can be substantially simplified, especially if no cooling of the pipe members or ends is necessary. It would also be possible, of course, for the packing element which is only pivotably mounted to be arranged on the stationary pipe end and for the packing element which is pivotably and slidably mounted to be provided on the movable pipe end. The arrangement described, however, will be more advantageous in most cases since it enables the operating or actuating device to be arranged on the stationary part of the installation. Of course, it is also conceivable that the packing arrangement is employed in conjunction with movable pipe members or conduits.

In the present example of application, the sealing-tightness of the construction described is fully adequate, since a slight leakage does not result in the escape of any flue gases due to the suction effect to which said gases are subjected, which creates within the pipeline a slight negative pressure relative to the surrounding atmosphere. Moreover, the packing still operates satisfactorily even when there appears a slight positive pressure in the pipeline. If, however, the standards of fluid-tightness required are relatively high, the gap between the sleeve member 14 and the pipe end can be covered by an additional, extensible bellows, and one or both of the sealing surfaces 10a, 11a at the packing elements 10, 11 can be covered with a flexible packing material.

Of course, depending on the maximum deviation of the longitudinal axis of the movable pipe end likely to occur in actual practice, a larger or smaller pivoting range can be provided for the packing elements 10 and 11. For example, in the case of the packing element 10 this is defined by the clearance relative to the pipe end 1 and by the extensibility of the bellows 15.

Having thus described the nature of the present invention what is desired to be secured by United States Letters Patent is:

1. Releasable packing adapted for the connection of a stationary pipe end to a confronting pipe end which is movable transverse to the pipe axis, comprising a first packing element, means for pivotably mounting said first packing element on one pipe end, a second packing element, means for mounting said second packing element on the other pipe end so as to be pivotable and slidable in the direction of the pipe axis, flexible packing means between each pipe end and its associated packing element, said packing elements being provided with mutually facing sealing surfaces and the axes of pivoting of the two packing elements being situated at least approximately at right angles to one another and to the pipe axis and means for displacing said second packing element towards said first packing element to bring said mutually facing sealing surfaces thereof into direct sealing contact.

2. Releasable packing according to claim 1, wherein said first packing element is annular in form, said second packing element being constructed as a tubular member which surrounds its associated pipe end with a certain clearance, said second packing element being pivotably mounted on a sleeve slidable on said associated pipe end.

3. The combination with a pair of oppositely arranged, relatively movable pipe members adapted to be detachably connected to one another, of a releasable packing assembly which comprises, a first packing element means for pivotably mounting said first packing element adjacent one end of one of said pipe members, a second packing element, means for pivotably mounting said second packing element adjacent one end of the other of said pipe members and to be axially slidable in the direction of its pipe axis toward said first packing element, flexible means interposed adjacent each pipe end and its associated packing element, said pivotable packing elements being provided with mutually facing sealing surfaces, each of said pivotable packing elements being pivotable about a respective pivot axis disposed at least approximately at right angles to one another and to the respective axis of its associated pipe member, and means for displacing said second packing element towards said first packing element to bring said mutually facing sealing surfaces thereof into direct sealing contact.

4. The combination with a pair of oppositely arranged, relatively movable pipe members adapted to be detachably connected to one another, of a releasable packing assembly which comprises, a first packing element, means for pivotably mounting said first packing element adjacent one end of one of said pipe members, a second packing element including sleeve means, means for pivotably mounting said second packing element to said sleeve means and adjacent one end of the other of said pipe members, said sleeve means and second packing element being axially slidable in the direction of its pipe axis toward said first packing element, flexible means interposed adjacent each pipe end and its associated packing element, each of said pivotable packing elements being pivotable about a respective pivot axis disposed at least approximately at right angles to one another and to the respective axis of its associated pipe member, said packing elements including confronting sealing surfaces, and means for displacing said sleeve means and said second packing element towards said first packing element in order to bring said sealing surfaces thereof into direct sealing contact.

5. In a releasable coupling assembly for releasably connecting two pipe members or the like to one another; first coupling means, second coupling means, first connecting means for pivotably connecting said first coupling means to a first pipe member, second connecting means for pivotably and slidably connecting said second coupling means to a second pipe member, said second coupling means being axially slidable toward said first coupling means for coupling therewith, said first coupling means and said second coupling means each being swingable about a respective pivot axis approximately perpendicular to one another and to the respective longitudinal axis of the associated pipe member, said first and second coupling means being provided with confronting sealing surfaces, and means for displacing said second coupling means towards said first coupling means to bring said confronting sealing surfaces into direct sealing contact.

6. In a releasable coupling assembly for releasably connecting two pipe members or the like to one another; first coupling means, second coupling means, first connecting means for pivotably connecting said first coupling means to a first pipe member, second connecting means including an axially displaceable sleeve member for pivotably and slidably connecting said second coupling means to a second pipe member, said second coupling means being axially slidable toward said first coupling means for coupling therewith, said first coupling means and said second coupling means each being pivotable about a respective pivot axis substantially perpendicular to one another and to the respective longitudinal axis of the associated pipe member, said first and second coupling means being provided with confronting sealing surfaces, and means for displacing said sleeve member and second coupling means towards said first coupling means in order to bring said confronting sealing surfaces into direct sealing contact.

7. The combination with a pair of oppositely arranged pipe members relatively movable to one another and adapted to be detachably connected with one another, of a releasable packing assembly which comprises, a first packing element, means for pivotably mounting said first packing element adjacent one end of one of said pipe members, a second packing element, means for pivotably mounting said second packing element adjacent one end of the other of said pipe members and to be axially slidable in the direction of its pipe axis toward said first packing element, flexible means interposed adjacent each pipe end and its associated packing element, each of said pivotable packing elements being pivotable about only a single respective pivot axis disposed at least approximately at right angles to one another and to the respective axis of its associated pipe member, said packing elements being provided with confronting sealing surfaces, and means for displacing said second packing element towards said first packing element to bring said confronting sealing surfaces into direct sealing contact.

8. The combination with a pair of oppositely arranged solid body pipe members relatively movable to one another and adapted to be detachably connected with one another, of a releasable packing assembly which comprises, a first packing element, means for pivotably mounting said first packing element adjacent and relative to one end of one of said solid body pipe members, a second packing element, means for pivotably mounting said second packing element adjacent and relative to one end of the other of said solid body pipe members and to be axially slidable relative to the latter in the direction of its pipe axis toward said first packing element, flexible means interposed adjacent each pipe end and its associated packing element, each of said pivotable packing elements being pivotable about a respective pivot axis disposed at least approximately at right angles to one another and to the respective axis of its associated pipe member, said packing elements being provided with confronting sealing surfaces, and means for displacing said second packing element towards said first packing element to bring said confronting sealing surfaces into direct sealing contact.

References Cited in the file of this patent

UNITED STATES PATENTS

| | | |
|---|---|---|
| 599,782 | Harding | Mar. 1, 1898 |
| 1,220,270 | Phillips | Mar. 27, 1917 |
| 1,620,094 | Gillick | Mar. 8, 1927 |
| 2,272,890 | Bosomworth | Feb. 10, 1942 |
| 2,826,403 | Moklebust | Mar. 11, 1958 |
| 2,916,307 | Peters | Dec. 8, 1959 |
| 3,066,960 | Adams | Dec. 4, 1962 |

FOREIGN PATENTS

| | | |
|---|---|---|
| 650,259 | France | Sept. 17, 1928 |
| 532,596 | Germany | Aug. 31, 1931 |